US008607330B2

(12) United States Patent
Childress et al.

(10) Patent No.: US 8,607,330 B2
(45) Date of Patent: Dec. 10, 2013

(54) ORDERLY CHANGE BETWEEN NEW AND OLD PASSWORDS

(75) Inventors: Rhonda L. Childress, Austin, TX (US); Itzhack Goldberg, Haifa (IL); Julianne F. Haugh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 231 days.

(21) Appl. No.: 12/875,934

(22) Filed: Sep. 3, 2010

(65) Prior Publication Data

US 2012/0060213 A1  Mar. 8, 2012

(51) Int. Cl.
G06F 21/00 (2013.01)
(52) U.S. Cl.
USPC ..................................... 726/18; 726/5; 726/6
(58) Field of Classification Search
USPC .......................................................... 726/18
See application file for complete search history.

(56) References Cited

U.S. PATENT DOCUMENTS

| | | | | |
|---|---|---|---|---|
| 5,719,941 | A | 2/1998 | Swift et al. | 713/155 |
| 5,991,879 | A | 11/1999 | Still | 726/1 |
| 6,754,349 | B1 | 6/2004 | Arthan | 380/286 |
| 7,249,261 | B2 | 7/2007 | Charbonneau | 713/184 |
| 7,530,097 | B2 * | 5/2009 | Casco-Arias et al. | 726/6 |
| 2002/0091947 | A1 * | 7/2002 | Nakamura | 713/202 |
| 2004/0030932 | A1 * | 2/2004 | Juels et al. | 713/202 |
| 2004/0078775 | A1 | 4/2004 | Chow et al. | 717/100 |
| 2004/0168068 | A1 | 8/2004 | Goal et al. | 713/184 |
| 2005/0125699 | A1 | 6/2005 | Harper | 713/202 |
| 2006/0037066 | A1 * | 2/2006 | Audebert | 726/5 |
| 2006/0048215 | A1 | 3/2006 | Brown et al. | 726/7 |
| 2006/0095785 | A1 | 5/2006 | White | 713/184 |
| 2006/0294391 | A1 | 12/2006 | Wu | 713/182 |
| 2007/0124807 | A1 * | 5/2007 | Jau | 726/6 |
| 2007/0174901 | A1 | 7/2007 | Chang et al. | 726/5 |
| 2007/0226791 | A1 | 9/2007 | Charbonneau | 726/18 |
| 2009/0210938 | A1 | 8/2009 | Childress et al. | 726/18 |
| 2010/0146602 | A1 * | 6/2010 | Delia et al. | 726/6 |

OTHER PUBLICATIONS

Microsoft Windows XP Professional Product Documentation; Microsoft; Oct. 4, 2009; p. 1.*

* cited by examiner

*Primary Examiner* — Jason K. Gee
*Assistant Examiner* — Henry Tsang
(74) *Attorney, Agent, or Firm* — VanLeeuwen & VanLeeuwen; Libby Z. Toub (57) ABSTRACT

A processor stores a current password in a current password storage area, which results in committing the current password as a valid password. In turn, the processor initiates a password change interval that indicates a required point at which to change the current password. The processor also stores a future password in a future password storage area, which activates the future password. Activating the future password allows a user to login using the future password, but is independent of the password change interval (e.g., does not reset the password change interval). The processor subsequently receives a login request from a user that includes a login password, and determines that the login password matches the future password. As a result, the processor authorizes the user in response to determining that the login password matches the future password.

17 Claims, 7 Drawing Sheets

ORDERLY CHANGE BETWEEN NEW AND OLD PASSWORDS

TECHNICAL FIELD

The present disclosure relates to allowing a user to login to a computer system using a "future" password prior to committing the future password as a new password.

BACKGROUND

Computer applications typically require a user to periodically change passwords in order to decrease the probability of the user's password being compromised. For example, computer applications may require a user to change passwords according to a timeframe (e.g., every 90 days) and/or after number of times that a user logs in using the password (e.g., every 200 log ins). In addition, when a user periodically changes their password, a malicious person is less prone to capture the user's password from "shoulder surfing," which involves the malicious person repeatedly observing a user's login procedure and identifying different characters of the password during each observation until the malicious person captures the user's entire password.

SUMMARY

A processor stores a current password in a current password storage area, which results in committing the current password as a valid password. In turn, the processor initiates a password change interval that indicates a required point at which to change the current password. The processor also stores a future password in a future password storage area, which activates the future password. Activating the future password allows a user to login using the future password, but is independent of the password change interval (e.g., does not reset the password change interval).

The processor subsequently receives a login request from a user that includes a login password, and determines that the login password matches the future password. As a result, the processor authorizes the user in response to determining that the login password matches the future password.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE DRAWINGS

The present disclosure may be better understood, and its numerous objects, features, and advantages made apparent to those skilled in the art by referencing the accompanying drawings, wherein.

DETAILED DESCRIPTION

Certain specific details are set forth in the following description and figures to provide a thorough understanding of various embodiments of the disclosure. Certain well-known details often associated with computing and software technology are not set forth in the following disclosure, however, to avoid unnecessarily obscuring the various embodiments of the disclosure. Further, those of ordinary skill in the relevant art will understand that they can practice other embodiments of the disclosure without one or more of the details described below. Finally, while various methods are described with reference to steps and sequences in the following disclosure, the description as such is for providing a clear implementation of embodiments of the disclosure, and the steps and sequences of steps should not be taken as required to practice this disclosure. Instead, the following is intended to provide a detailed description of an example of the disclosure and should not be taken to be limiting of the disclosure itself. Rather, any number of variations may fall within the scope of the disclosure, which is defined by the claims that follow the description.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The following detailed description will generally follow the summary of the disclosure, as set forth above, further explaining and expanding the definitions of the various aspects and embodiments of the disclosure as necessary.

Figure 1:
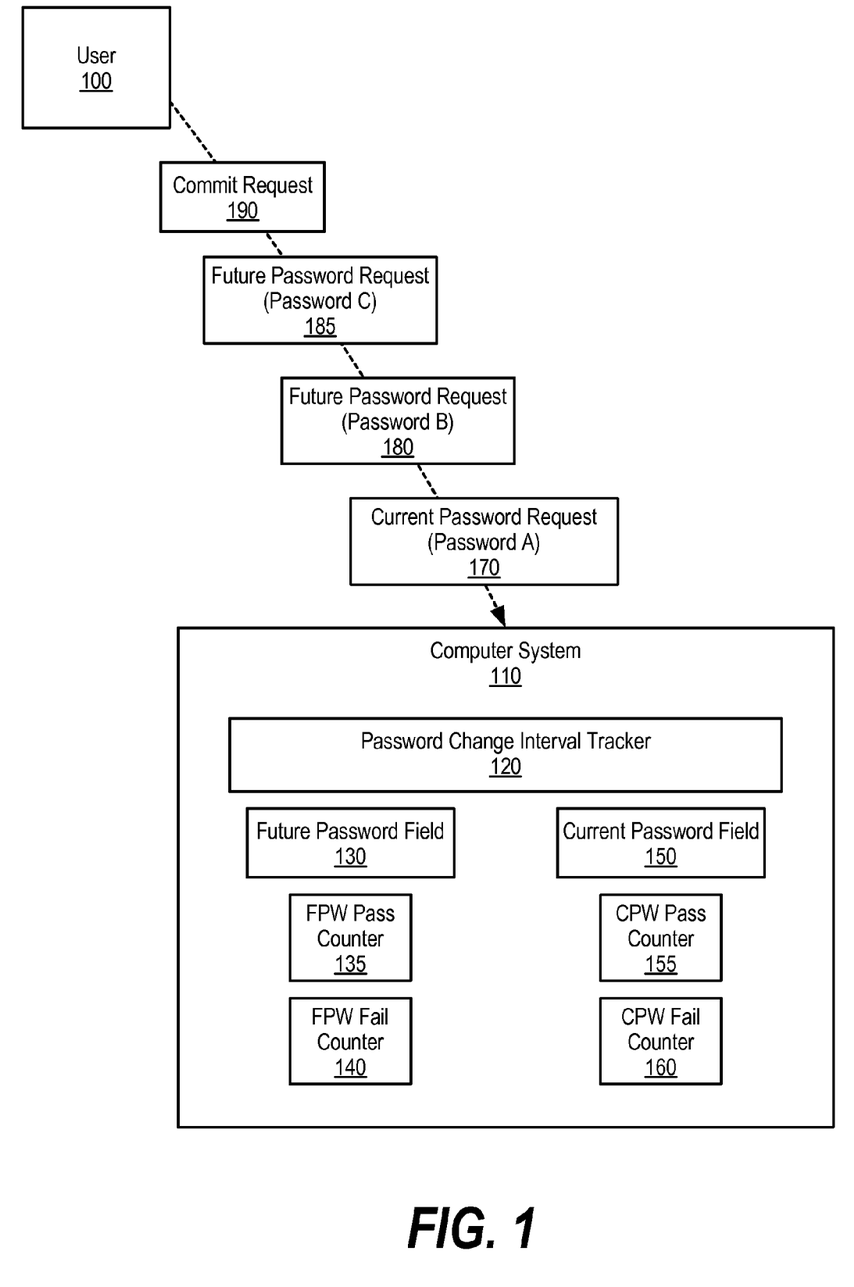
FIG. 1 is a diagram showing a computer system that allows a user to login to the computer system using a current password or a "future" password.

FIG. 1 is a diagram showing a computer system that allows a user to login to the computer system using a current password or a "future" password. Computer system 110 includes current password field 150, which stores a current password for authentication purposes. In addition, computer system 110 includes future password field 130, which stores a "future" password for authentication purposes that, in turn, allows user 100 to login to computer system 110 by supplying either the current password or the future password as a login password. In one embodiment, user 100 may change the future password an arbitrary number of times without restarting a "password change interval," thus allowing user 100 to experiment with different passwords before computer system 110 requires user 100 to change the current password. As those skilled in the art can appreciate, future password field 130 and current password field 150 may be implemented in a variety of ways, including separate fields in a single table or an additional table with fields capable of including the password information.

User 100 sends current password request 170 (includes password "A") to computer system 110, which requests computer system 110 to store password A as a current password (e.g., store password A in current password field 150). As such, computer system 110 compares password A against password criteria requirements, such as whether password A includes a minimum number of characters, a minimum number of numerals, and/or if password A has been recently used (see FIG. 3 and corresponding text for further details).

When password A does not meet the password criteria requirements, computer system 110 informs user 100 and requests a different password. When password A meets the password criteria requirements, computer system 110 stores password A in current password field 150 as a "current password." In addition, password change interval tracker 120 initiates and begins to track a password change interval. In one embodiment, the password change interval may be time-based, such as requiring user 100 to change the current password every 90 days, and/or the password change interval may be quantity based. For example, password change interval tracker 120 may use current password pass counter 155 to track the number of times that user 100 successfully logs in using password A as a login password. In this example, password change interval tracker 120 requests user 100 to change the current password after successfully logging in 100 times.

User 100 sends future password request 180 (includes password "B") to computer system 110, which requests computer system 110 to store password B as a future password (e.g., store password B in future password field 130). As such, computer system 110 compares password B against the same password criteria requirements as that for the current password A as discussed above. When password B does not meet the password criteria requirements, computer system 110 informs user 100 and requests a different password. When password B meets the password criteria requirements, computer system 110 stores password B in future password field 130 as a "future password." In one embodiment, when a user abandons entering a future password, computer system 110 may clear future password field 130. Or, in this embodiment, when user 100 is in the process of replacing an old future password with a new future password and abandons entering a new future password, computer system 110 may reload the old future password in future password field 130.

Password change interval tracker 120, however, does not reset the password change interval when computer system 110 stores the future password in future password field 130. At this point, user 100 may login to computer system 110 using either password A or password B as a login password. For example, user 100 may wish to test password B's ease of use (e.g., whether user 100 will remember password B). As such, user 100 may attempt to login to computer system 110 for a period of time using password B. In situations when user 100 does not prefer password B, user 100 may send future password request 185 to computer system 110, which includes password C. As such, computer system 110 checks password C against password criteria requirements and stores password C in future password field 130 accordingly. Again, password change interval tracker 120 does not reset the password change interval. At this point, user 100 may login to computer system 100 using either password A (current password) or password C (future password). In one embodiment, password change interval tracker 120 uses various counters to track current password activity and future password activity, such as counters 135, 140, 155, and 160 (see FIGS. 3, 4, and corresponding text for further details).

At some point, user 100 may wish to change the future password to the current password or be forced to commit the future password because password A has expired. As such, user 100 sends commit request 190 to computer system 110. In turn, password change interval tracker 120 moves the future password stored in future password store 130 to current password field 150, thus making the future password the new current password. In addition, password change interval tracker 120 resets future password field 130 (or resets a future password valid flag) and resets counters 135, 140, 155, and 160 accordingly (see FIG. 5 and corresponding text for further details). In one embodiment, a future password valid indicator and a "committed" indicator (e.g., a bit or a flag) are used to indicate whether the future password is valid and whether the future password is committed to being the future password, respectively.

In one embodiment, password change interval tracker 120 may automatically move the future password to current password field 150 based on other situations, such as when the current password expires or when user 100 logs on using the future password a pre-configured number of times.

Figure 2:
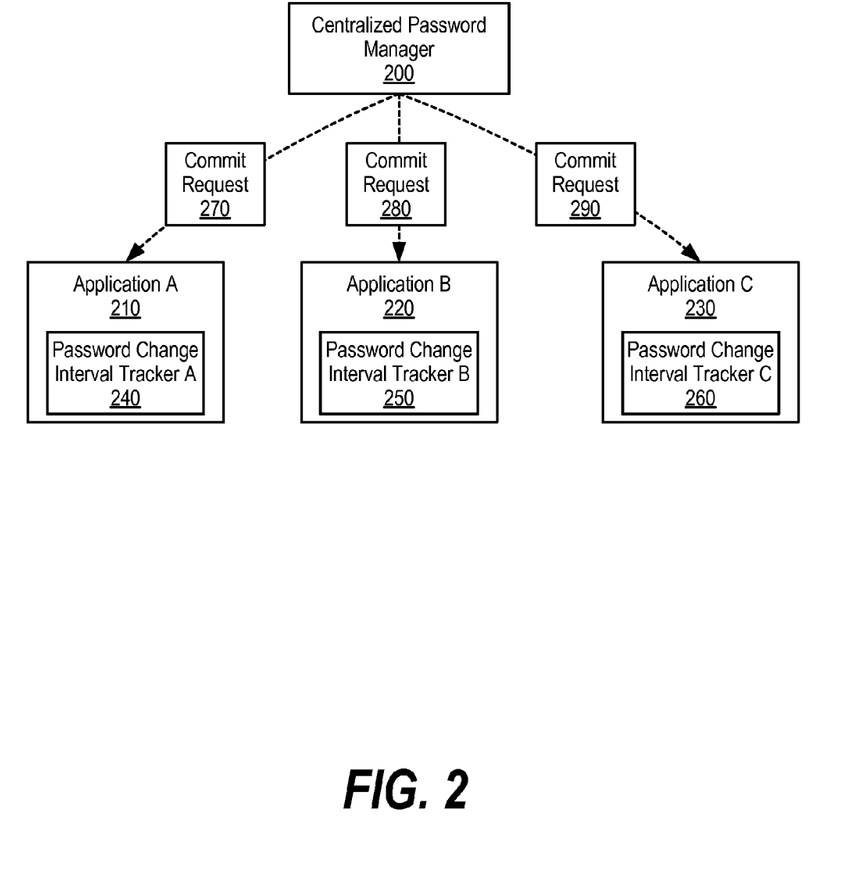
FIG. 2 a diagram showing an example of a centralized password manager implementing the disclosure described herein.

FIG. 2 a diagram showing an example of a centralized password manager implementing the disclosure described herein. Centralized password manager 200 manages password changes for applications 210, 220, and 230. As those skilled in the art can appreciate, applications 210, 220, and 230 may reside on a single computer system or may each reside on different computer systems.

Each of applications 210-230 has respective password change interval trackers 240-260. As such, assuming a user provided future passwords to each password change interval tracker, the user may login to application A 210 using a future password or a current password, and likewise for applications B 220 and C 230. In one embodiment, each of applications 210-230 has different password criteria requirements (e.g., a minimum number of characters, etc.).

At some point, either through the user's request or through an automated process, centralized password manager 200 sends commit requests 270-290 to applications 210-230, respectively. In turn, each of password change interval trackers 240-260 change the future password to the current password as discussed in FIG. 1.

Figure 3:
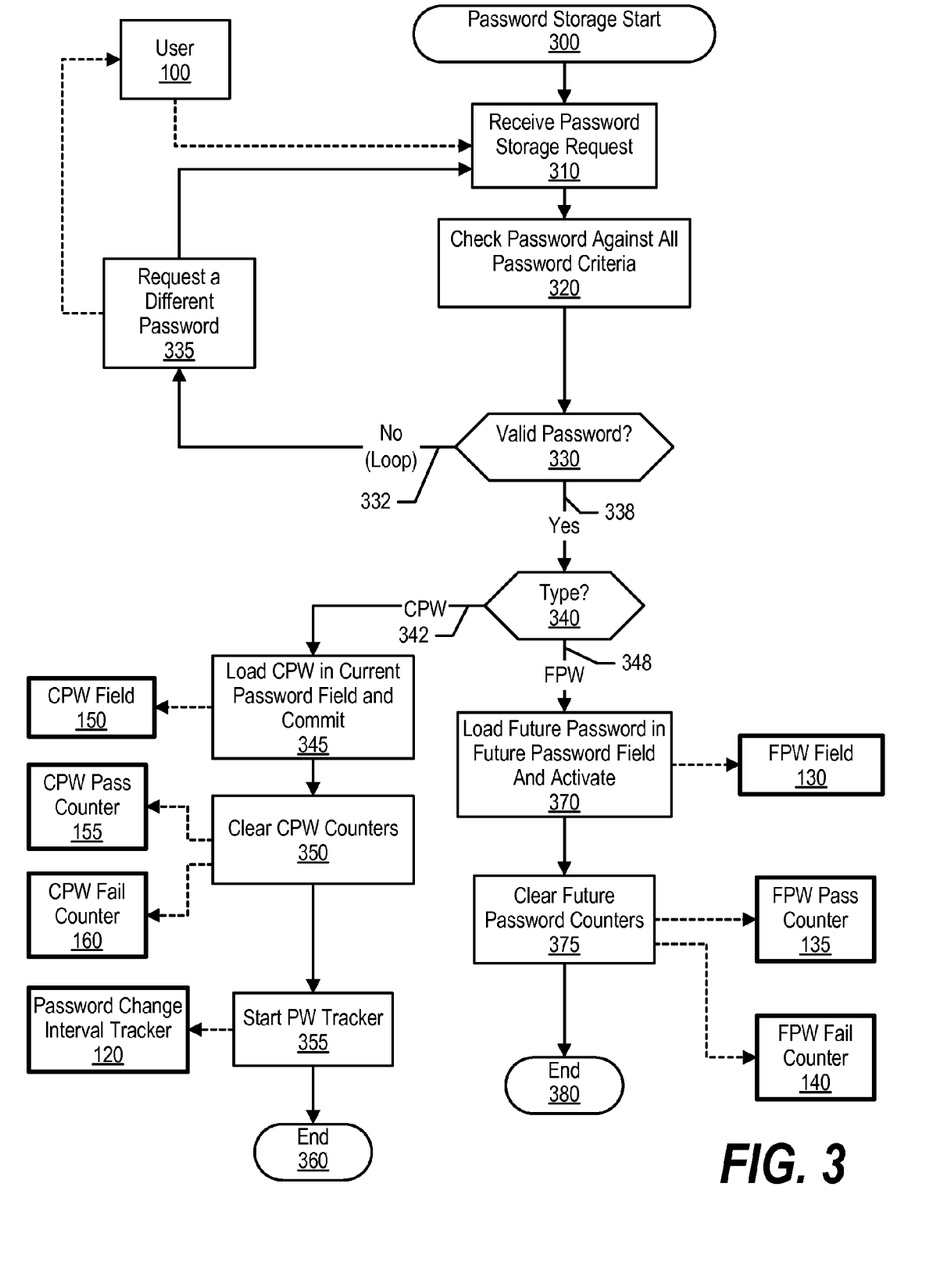
FIG. 3 is a flowchart showing steps taken in validating and storing passwords.

FIG. 3 is a flowchart showing steps taken in validating and storing passwords. Processing commences at 300, whereupon processing receives a password storage request from user 100 at step 310. The password storage request is a request to store an included password in an authorization data storage area that is used to subsequently authorize a user by matching the stored password with a login password. In one embodiment, the password storage request includes an indication as to whether the included password should be stored as a current password (e.g., a committed password) or a future password (e.g., a non-committed password).

At step 320, processing checks the password against password criteria, such as whether the password includes a minimum number of characters, whether the password has been recently used, and/or whether the password includes a minimum number of numerals. In one embodiment with multiple applications having different password criteria requirements, processing checks passwords against each of the application's password criteria requirements, such as by using a password history comparison test. In this embodiment, the "future" password is compared against previous "committed" passwords. Thus, if a user attempts to set a current password or future password as "passwor4" and one of the applications refuses to permit a password with a trailing numeral, the user may select "passw0rd" and satisfy a "one numeric character" requirement from one application and not fail a "no more than two characters in common with previous password" requirement from another application. In another embodiment, when the password criteria changes (e.g., requires 10 characters instead of 8 characters), processing analyzes stored passwords and informs the user to change passwords accordingly.

A determination is made as to whether the received password is valid based upon the password criteria (decision 330). If the password is not valid, decision 330 branches to "No" branch 332, whereupon processing loops back to request a different password from user 100 at step 335. This looping continues until processing receives a valid password, at which point decision 330 branches to "Yes" branch 338.

A determination is made as to whether user 100 requests the received password to be a current password or a future password (decision 340). For example, user 100's password storage request may include a field that indicates whether the received password should be stored as a current password or a future password. If the received password should be stored as a current password, decision 340 branches to "current password" branch 342, whereupon processing loads the received password in current password field 150 and commits the current password (step 345). Committing the current password starts a password change interval, which is discussed below. Next, processing clears current password counters 155 and 160 (step 350). Processing then initiates password change interval tracker 120 at step 355 to start tracking password activity and, in turn, indicate a point at which to change the current password. For example, password change interval tracker 120 may allow the received password to be valid for 90 days. In another example, password change interval tracker 120 may allow user 100 to login using the received password for a pre-defined number of times (see FIG. 5 and corresponding text for further details). Processing ends at 360.

On the other hand, if user 100 requests the received password to be a future password, decision 340 branches to "future password" branch 348 whereupon processing stores the received password in future password field 130 and activates the future password (step 370). "Activating" the future password allows a user to login using the future password, but does not reset the password change interval (as opposed to "committing" a password). Next, processing clears future password counters 135 and 140 at step 375. Since the received password is stored as a future password, processing does not re-initiate password change interval tracker 120. As such, user 100 may login using a login password that matches the stored future password in order to determine whether the stored future password is worthy of being utilized as a current password. Processing ends at 380.

Figure 4:
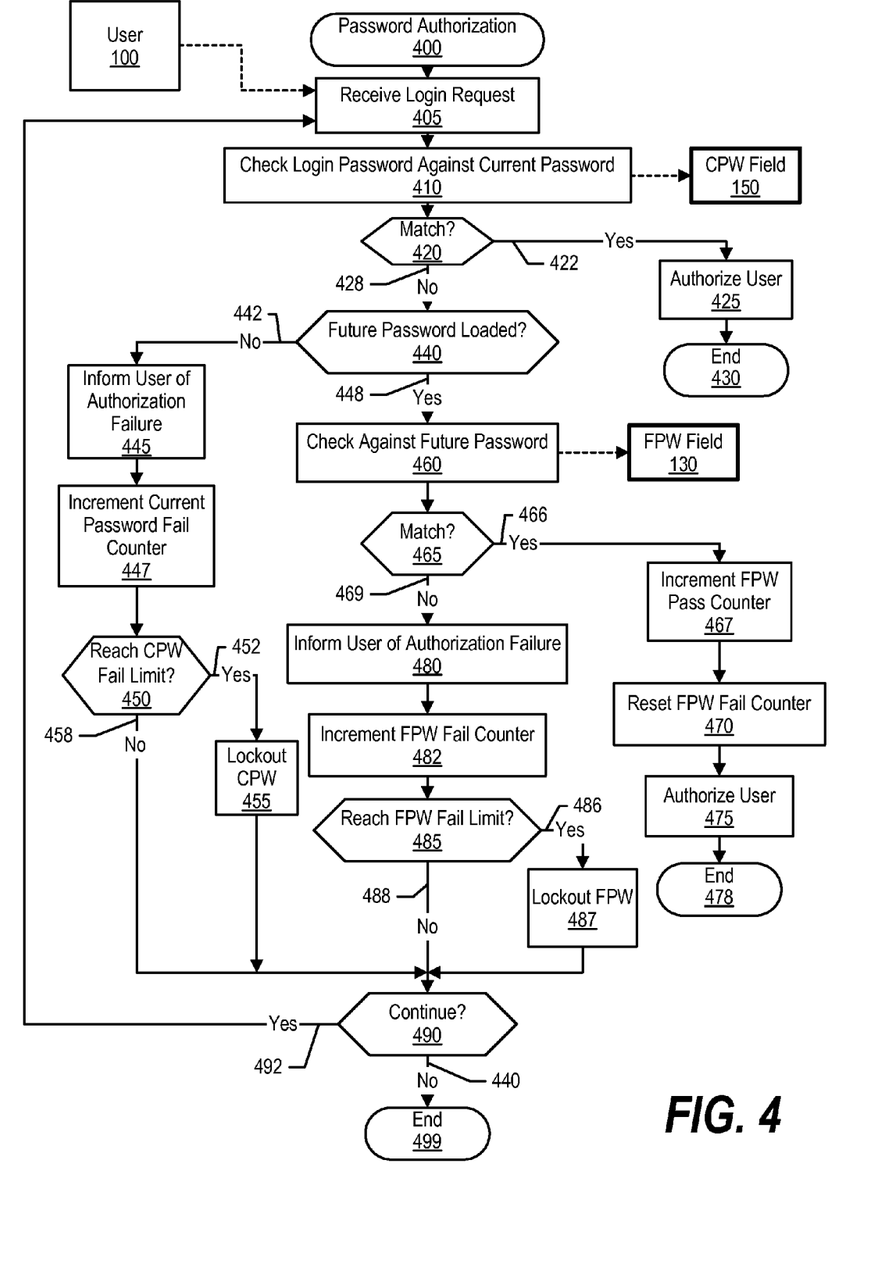
FIG. 4 is a flowchart showing steps taken in authorizing login passwords.

FIG. 4 is a flowchart showing steps taken in authorizing login passwords. Password authorization commences at 400, whereupon processing receives a login request, which includes a login password, from user 100 at step 405. At step 410, processing checks the login password against a current password stored in current password field 150 (see FIG. 3 and corresponding text for further details).

A determination is made as to whether the login password matches the current password (decision 420). If the login password matches the current password, decision 420 branches to "Yes" branch 422 whereupon processing authorizes user 100 and password authorization ends at 430. In one embodiment, processing may increment a current password pass counter in order to track an amount of times that user 100 logs on using the current password. In this embodiment, a password change interval tracker may require user 100 to change the current password after logging in a pre-defined number of times using the current password (see FIG. 5 and corresponding text for further details).

On the other hand, of the login password does not match the current password, decision 420 branches to "No" branch 428, whereupon a determination is made as to whether a future password is loaded in future password field 130 (decision 440). For example, processing may set a future password valid bit when a user provides a future password to load in future password field 130 (see FIG. 3 and corresponding text for further details).

If future password field 130 includes a future password, decision 440 branches to "Yes" branch 448, whereupon processing checks the login password against the future password stored in future password field 130 (step 460). A determination is made as to whether the login password matches the future password (decision 465). If the login password matches the future password, decision 465 branches to "Yes" branch 466, whereupon processing increments a future password pass counter at step 467, which tracks the number of times that user 100 logs on using the future password. Processing also resets a future password fail counter at step 470, which tracks the number of consecutive times that user 100 fails to log on (see below). Processing authorizes user 100 at step 475 and authorization processing ends at 478.

Referring back to decision 440, when future password field 130 does not include a future password, decision 440 branches to "No" branch 442, whereupon processing informs user 100 that the login password is not correct (does not match the current password) at step 445. At step 447, processing increments a current password fail counter that tracks the number of consecutive times that user 100 attempts to login and fails.

A determination is made as to whether the current password fail counter reaches a threshold, such as allowing user to attempt to login a maximum of three times without success (decision 450). If the current password fail counter reaches the threshold, decision 450 branches to "Yes" branch 450 whereupon processing locks out user 100 from logging in using the current password. For example, processing may lockout user 100 until user 100 contacts a system administrator to reset user 100's current password. On the other hand, if the current password fail counter has not reached the threshold, decision 450 branches to "No" branch 458, bypassing step 455.

Similarly, referring back to decision 465, when the login password fails to match the future password, decision 465 branches to "No" branch 469, whereupon processing informs user 100 that the login password is not correct (does not match the current password or the future password) at step 480. At step 482, processing increments a future password fail counter that tracks the number of consecutive times that user 100 attempts to login and fails. Processing increments the future password counter at this point because, in one embodiment, processing logic is based upon the assumption that user 100 knows the current password and is testing the future password.

A determination is made as to whether the future password fail counter reaches a threshold, such as allowing user to attempt to login a maximum of three times without success (decision 485). If the future password fail counter reaches the threshold, decision 485 branches to "Yes" branch 486 whereupon processing locks out user 100 from logging in using the future password. In one embodiment, user 100 may still login using the current password. On the other hand, if the future password fail counter has not reached the threshold, decision 485 branches to "No" branch 488, bypassing step 487.

A determination is made as to whether to continue password authorization (decision 490). If password authorization should continue, decision 490 branches to "Yes" branch 492, which loops back to receive another login request from use 100. On the other hand, if password authorization should terminate, such as a point when the current password and future password are locked out, decision 490 branches to "No" branch 498 whereupon password authorization processing ends at 499.

Figure 5:
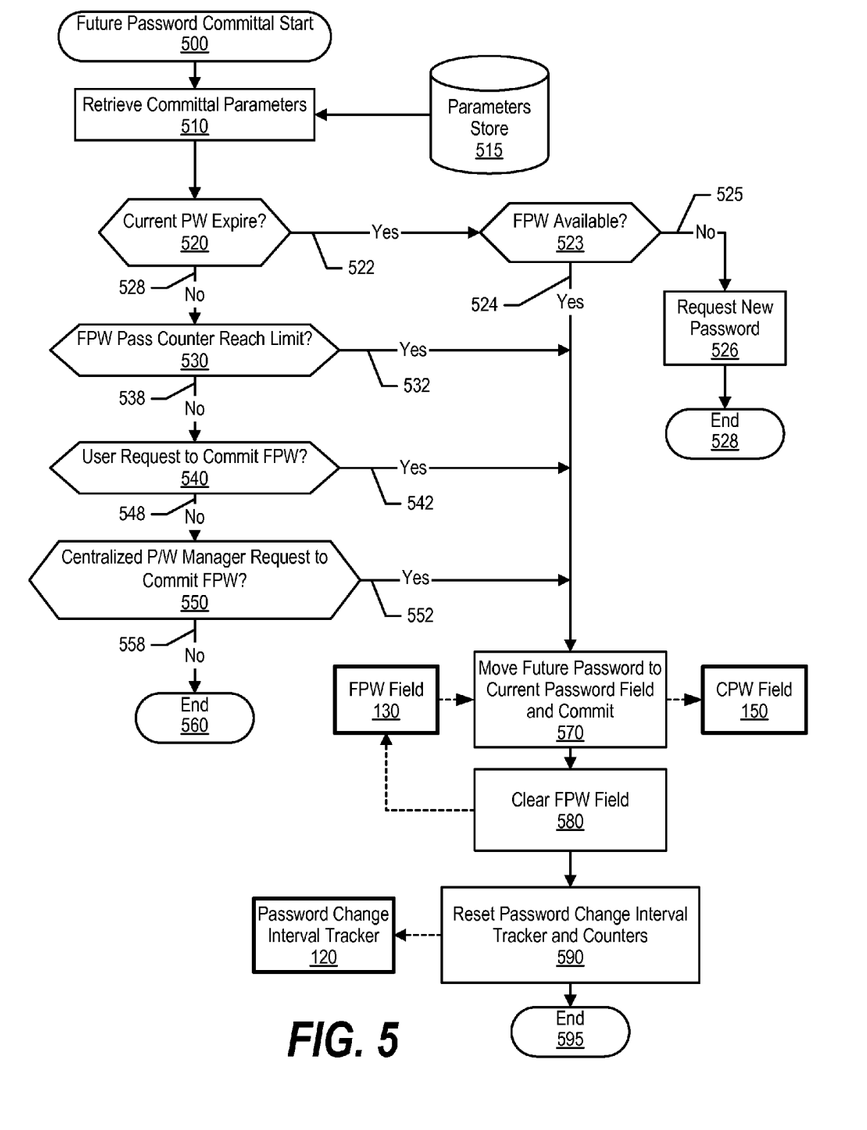
FIG. 5 is a flowchart showing steps taken in committing a future password as a current password.

FIG. 5 is a flowchart showing steps taken in committing a future password as a current password. Processing commences at 500, whereupon processing retrieves committal parameters from parameters store 515 (step 510). In one embodiment, the committal parameters indicate when to change the current password, such as after the current password has been used for 90 days.

When the committal parameters include a current password time limit (e.g., 90 days) or a maximum number of times that a user may use the current password (e.g., 150 times), a determination is made as to whether the current password has expired (decision 520). If the current password has expired (e.g., reaching the time limit or amount of times to use the password), decision 520 branches to "Yes" branch 522, whereupon a determination is made as to whether a future password resides in future password field 130 (decision 523). If a future password does not exist, decision 523 branches to "No" branch 525, whereupon processing requests a new password from the user at step 526 and processing ends at 528 (see FIG. 3 and corresponding text for further details).

On the other hand, if a future password is available, decision 523 branches to "Yes" branch 524, whereupon processing moves the future password stored in future password field 130 to current password field 150, thus committing the future password as the current password (step 570). In one embodiment discussed above, when the password criteria changes (e.g., requires 10 characters instead of 8 characters), processing analyzes the future password and informs the user to change passwords if the future password does not meet the new password criteria.

Processing, at step 580, clears future password field 130 (or resets a future password valid bit), thus invalidating a future password until a user provides another future password. At step 590, processing resets password change interval tracker 120 along with resetting current password and future password counters (e.g., counters 135, 140, 155, and 160 shown in FIG. 1). At this point, password change interval tracker 120 tracks password activity based upon the new current password (old future password). Processing ends at 595.

Referring back to decision 520, if the current password time limit has not expired (or if the committal parameters do not include a current password time limit/usage limit), decision 520 branches to "No" branch 528, whereupon a determination is made as to whether the future password pass counter, which tracks the number of successful login attempts using the future password, reaches a future password usage limit (decision 530). For example, the committal parameters may allow a user to login using the future password for a maximum of 100 times (before the current password expires). If the future password pass counter reaches the future password usage limit, decision 530 branches to "Yes" branch 532, whereupon processing executes steps 570 through 595 as discussed above.

On the other hand, if the future password pass counter has not reached the future password usage limit (or if the committal parameters do not include a future password usage limit), decision 530 branches to "No" branch 538, whereupon a determination is made as to whether the user requested to commit the future password (decision 540). If the user requested to commit the future password, decision 540 branches to "Yes" branch 542, whereupon processing executes steps 570 through 595 as discussed above. On the other hand, if the user did not request to commit the future password, decision 540 branches to "No" branch 548, whereupon a determination is made as to whether a centralized password manager requested to commit the future password (see FIG. 2 and corresponding text for further details) (decision 550). If the centralized password manager requested to commit the future password, decision 550 branches to "Yes" branch 552, whereupon processing executes steps 570 through 595 as discussed above. On the other hand, if the centralized password manager did not request to commit the future password, decision 550 branches to "No" branch 558 whereupon processing ends at 560.

Figure 6:
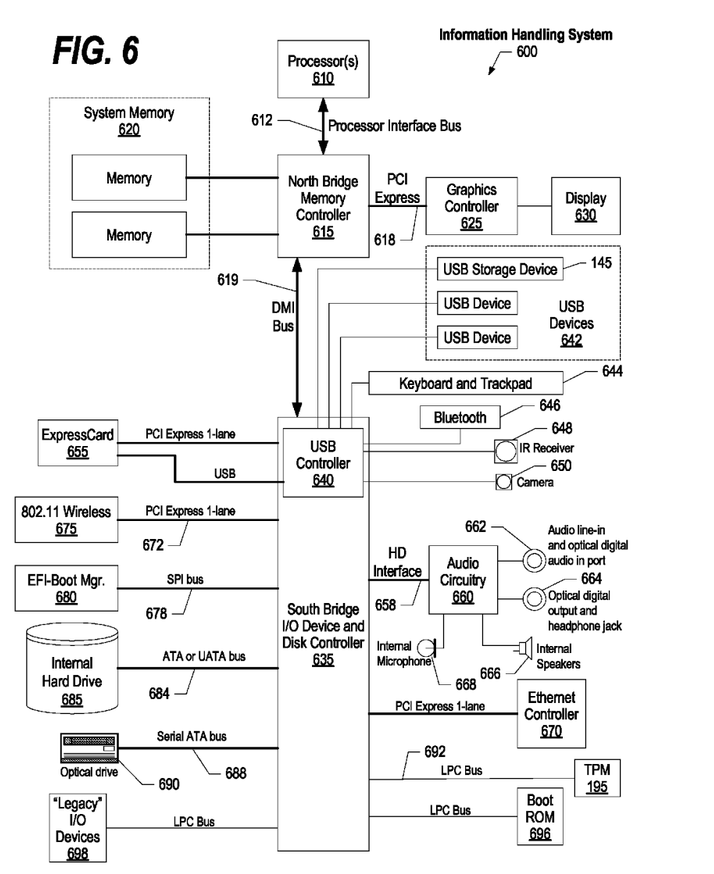
FIG. 6 is a block diagram example of a data processing system in which the methods described herein can be implemented.

FIG. 6 illustrates information handling system 600, which is a simplified example of a computer system capable of performing the computing operations described herein. Information handling system 600 includes one or more processors 610 coupled to processor interface bus 612. Processor interface bus 612 connects processors 610 to Northbridge 615, which is also known as the Memory Controller Hub (MCH). Northbridge 615 connects to system memory 620 and provides a means for processor(s) 610 to access the system memory. Graphics controller 625 also connects to Northbridge 615. In one embodiment, PCI Express bus 618 connects Northbridge 615 to graphics controller 625. Graphics controller 625 connects to display device 630, such as a computer monitor.

Northbridge 615 and Southbridge 635 connect to each other using bus 619. In one embodiment, the bus is a Direct Media Interface (DMI) bus that transfers data at high speeds in each direction between Northbridge 615 and Southbridge 635. In another embodiment, a Peripheral Component Interconnect (PCI) bus connects the Northbridge and the Southbridge. Southbridge 635, also known as the I/O Controller Hub (ICH) is a chip that generally implements capabilities that operate at slower speeds than the capabilities provided by the Northbridge. Southbridge 635 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 696 and "legacy" I/O devices (using a "super I/O" chip). The "legacy" I/O devices (698) can include, for example, serial and parallel ports, keyboard, mouse, and/or a floppy disk controller. The LPC bus also connects Southbridge 635 to Trusted Platform Module (TPM) 695. Other components often included in Southbridge 635 include a Direct Memory Access (DMA) controller, a Programmable Interrupt Controller (PIC), and a storage device controller, which connects Southbridge 635 to nonvolatile storage device 685, such as a hard disk drive, using bus 684.

ExpressCard 655 is a slot that connects hot-pluggable devices to the information handling system. ExpressCard 655 supports both PCI Express and USB connectivity as it connects to Southbridge 635 using both the Universal Serial Bus (USB) the PCI Express bus. Southbridge 635 includes USB Controller 640 that provides USB connectivity to devices that connect to the USB. These devices include webcam (camera) 650, infrared (IR) receiver 648, keyboard and trackpad 644, and Bluetooth device 646, which provides for wireless personal area networks (PANs). USB Controller 640 also provides USB connectivity to other miscellaneous USB connected devices 642, such as a mouse, removable nonvolatile storage device 645, modems, network cards, ISDN connectors, fax, printers, USB hubs, and many other types of USB connected devices. While removable nonvolatile storage device 645 is shown as a USB-connected device, removable nonvolatile storage device 645 could be connected using a different interface, such as a Firewire interface, etcetera.

Wireless Local Area Network (LAN) device 675 connects to Southbridge 635 via the PCI or PCI Express bus 672. LAN device 675 typically implements one of the IEEE 802.11 standards of over-the-air modulation techniques that all use the same protocol to wirelessly communicate between information handling system 600 and another computer system or device. Optical storage device 690 connects to Southbridge 635 using Serial ATA (SATA) bus 688. Serial ATA adapters and devices communicate over a high-speed serial link. The Serial ATA bus also connects Southbridge 635 to other forms of storage devices, such as hard disk drives. Audio circuitry 660, such as a sound card, connects to Southbridge 635 via bus 658. Audio circuitry 660 also provides functionality such as audio line-in and optical digital audio in port 662, optical digital output and headphone jack 664, internal speakers 666, and internal microphone 668. Ethernet controller 670 connects to Southbridge 635 using a bus, such as the PCI or PCI Express bus. Ethernet controller 670 connects information handling system 600 to a computer network, such as a Local Area Network (LAN), the Internet, and other public and private computer networks.

While FIG. 6 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 695) shown in FIG. 6 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 7.

Figure 7:
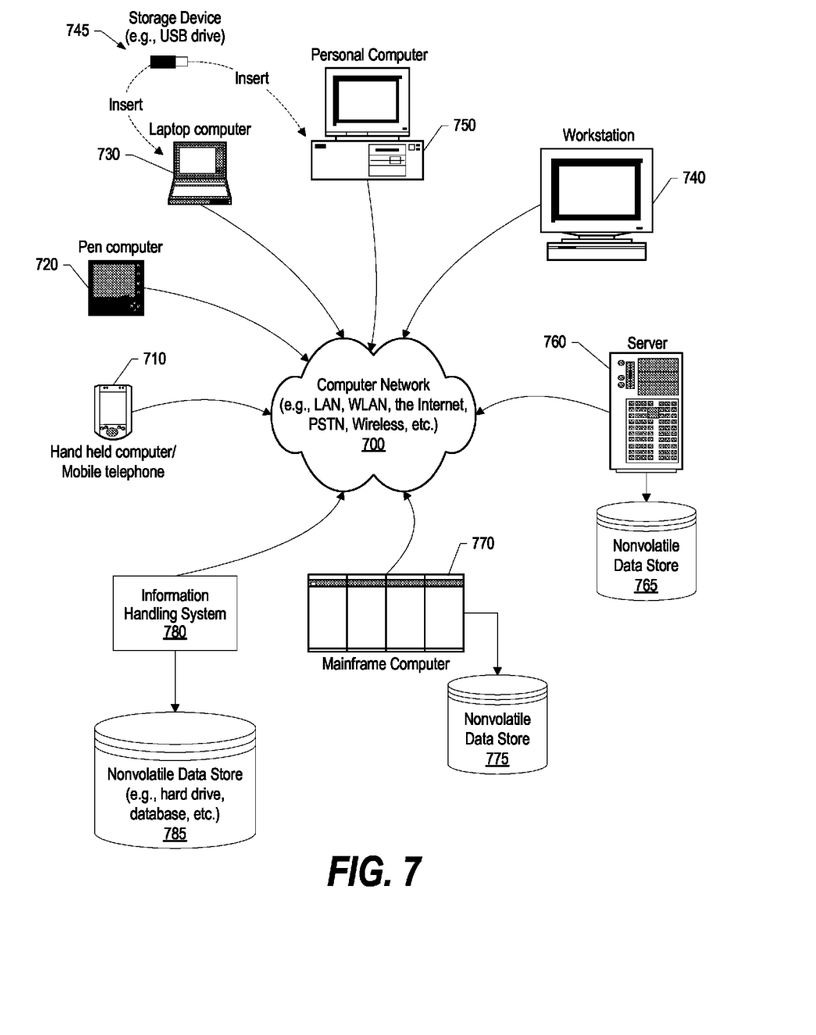
FIG. 7 provides an extension example of the information handling system environment shown in FIG. 6 to illustrate that the methods described herein can be performed on a wide variety of information handling systems which operate in a networked environment.

FIG. 7 provides an extension example of the information handling system environment shown in FIG. 6 to illustrate that the methods described herein can be performed on a wide variety of information handling systems that operate in a networked environment. Types of information handling systems range from small handheld devices, such as handheld computer/mobile telephone 710 to large mainframe systems, such as mainframe computer 770. Examples of handheld computer 710 include personal digital assistants (PDAs), personal entertainment devices, such as MP3 players, portable televisions, and compact disc players. Other examples of information handling systems include pen, or tablet, computer 720, laptop, or notebook, computer 730, workstation 740, personal computer system 750, and server 760. Other types of information handling systems that are not individually shown in FIG. 7 are represented by information handling system 780. As shown, the various information handling systems can be networked together using computer network 700. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 7 depicts separate nonvolatile data stores (server 760 utilizes nonvolatile data store 765, mainframe computer 770 utilizes nonvolatile data store 775, and information handling system 780 utilizes nonvolatile data store 785). The nonvolatile data store can be a component that is external to the various information handling systems or can be internal to one of the information handling systems. In addition, removable nonvolatile storage device 745 can be shared among two or more information handling systems using various techniques, such as connecting the removable nonvolatile storage device 745 to a USB port or other connector of the information handling systems.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

What is claimed is:

1. A machine-implemented method comprising:
    storing, by one or more hardware processors, a current password in a current password storage area and storing a future password in a future password storage area, the current password different than the future password;
    utilizing a current password pass counter to track a number of times a user logs in using the current password, and utilizing a future password pass counter to track a number of times the user logs in using the future password, the current password pass counter different than the future password pass counter;
    receiving a login request that includes a login password corresponding to a user;
    determining, by one or more of the hardware processors, that the login password matches the future password;
    incrementing the future password pass counter in response to determining that the login password matches the future password;
    determining whether the future password pass counter reaches a threshold; and
    indicating, by one or more of the hardware processors, to change the current password in response to the future password pass counter reaching the threshold.

2. The method of claim 1 wherein storing the current password results in committing the current password, and wherein storing the future password results in activating the future password, the method further comprising:
    initiating a password change interval in response to committing the current password, wherein the password change interval indicates a required point at which to change the current password, and wherein activating the future password is independent of resetting the password change interval;
    receiving a subsequent future password from the user;
    validating the subsequent future password against one or more password criteria requirements;
    replacing the future password with the subsequent future password in the future password storage area in response to validating the subsequent future password; and
    wherein the validation of the subsequent future password is independent from resetting the password change interval.

3. The method of claim 2 wherein, in response to the password change interval indicating to change the current password, the method further comprises:
    storing the future password in the current password storage area;
    clearing the future password storage area; and
    resetting the password change interval.

4. The method of claim 3 further comprising:
    invalidating the current password in response to changing the current password.

5. The method of claim 3 wherein each of a plurality of applications correspond to one of a plurality of password change interval trackers, each of the one of the plurality of password change interval trackers tracking a corresponding current password and a corresponding future password, the method further comprising:
- receiving a password change request from a centralized password manager at each of the plurality of password change interval trackers; and
- replacing, by each of the plurality of password change interval trackers, their corresponding current password with their corresponding future password.

6. The method of claim 1 further comprising:
- receiving a request from the user to change the current password; and
- in response to receiving the request from the user to change the current password:
  - storing the future password in the current password storage area;
  - clearing the future password storage area; and
  - resetting a password change interval.

7. An information handling system comprising:
- one or more processors;
- a memory accessible by at least one of the processors;
- a set of instructions stored in the memory and executed by at least one of the processors in order to perform actions of:
  - storing a current password in a current password storage area and storing a future password in a future password storage area, the current password different than the future password;
  - utilizing a current password pass counter to track a number of times a user logs in using the current password, and utilizing a future password pass counter to track a number of times the user logs in using the future password, the current password pass counter different than the future password pass counter;
  - receiving a login request that includes a login password corresponding to a user;
  - determining that the login password matches the future password;
  - incrementing the future password pass counter in response to determining that the login password matches the future password;
  - determining whether the future password pass counter reaches a threshold; and
  - indicating to change the current password in response to the future password pass counter reaching the threshold.

8. The information handling system of claim 7 wherein storing the current password results in committing the current password and storing the future password results in activating the future password, and wherein the set of instructions, when executed by one of the processors, further performs actions of:
- initiating a password change interval in response to committing the current password, wherein the password change interval indicates a required point at which to change the current password, and wherein activating the future password is independent of resetting the password change interval;
- receiving a subsequent future password from the user;
- validating the subsequent future password against one or more password criteria requirements;
- replacing the future password with the subsequent future password in the future password storage area in response to validating the subsequent future password; and wherein the validation of the subsequent future password is independent from resetting the password change interval.

9. The information handling system of claim 8 wherein, in response to the password change interval indicating to change the current password, the set of instructions, when executed by one of the processors, further performs actions of:
- storing the future password in the current password storage area;
- clearing the future password storage area; and
- resetting the password change interval.

10. The information handling system of claim 9 wherein the set of instructions, when executed by one of the processors, further performs actions of:
- invalidating the current password in response to changing the current password.

11. The information handling system of claim 9 wherein each of a plurality of applications correspond to one of a plurality of password change interval trackers, each of the one of the plurality of password change interval trackers tracking a corresponding current password and a corresponding future password, and wherein the set of instructions, when executed by one of the processors, further performs actions of:
- receiving a password change request from a centralized password manager at each of the plurality of password change interval trackers; and
- replacing, by each of the plurality of password change interval trackers, their corresponding current password with their corresponding future password.

12. The information handling system of claim 7 wherein the set of instructions, when executed by one of the processors, further performs actions of:
- receiving a request from the user to change the current password; and
- in response to receiving the request from the user to change the current password:
  - storing the future password in the current password storage area;
  - clearing the future password storage area; and
  - resetting a password change interval.

13. A computer program product stored in a non-transitory computer readable medium, comprising functional descriptive material that, when executed by an information handling system, causes the information handling system to perform actions that include:
- storing a current password in a current password storage area and storing a future password in a future password storage area, the current password different than the future password;
- utilizing a current password pass counter to track a number of times a user logs in using the current password, and utilizing a future password pass counter to track a number of times the user logs in using the future password, the current password pass counter different than the future password pass counter;
- receiving a login request that includes a login password corresponding to a user;
- determining that the login password matches the future password;
- incrementing the future password pass counter in response to determining that the login password matches the future password;
- determining whether the future password pass counter reaches a threshold; and
- indicating to change the current password in response to the future password pass counter reaching the threshold.

14. The computer program product of claim 13 wherein storing the current password results in committing the current password and storing the future password results in activating the future password, and wherein the functional descriptive material that, when executed by the information handling system, causes the information handling system to further perform actions that include:
- initiating a password change interval in response to committing the current password, wherein the password change interval indicates a required point at which to change the current password, and wherein activating the future password is independent of resetting the password change interval;
- receiving a subsequent future password from the user;
- validating the subsequent future password against one or more password criteria requirements;
- replacing the future password with the subsequent future password in the future password storage area in response to validating the subsequent future password; and
- wherein the validation of the subsequent future password is independent from resetting the password change interval.

15. The computer program product of claim 14 wherein, in response to the password change interval indicating to change the current password, the functional descriptive material that, when executed by the information handling system, causes the information handling system to further perform actions that include:
- storing the future password in the current password storage area;
- clearing the future password storage area; and
- resetting the password change interval.

16. The computer program product of claim 15 wherein the functional descriptive material that, when executed by the information handling system, causes the information handling system to further perform actions that include:
- invalidating the current password in response to changing the current password.

17. The computer program product of claim 15 wherein each of a plurality of applications correspond to one of a plurality of password change interval trackers, each of the one of the plurality of password change interval trackers tracking a corresponding current password and a corresponding future password, the functional descriptive material that, when executed by the information handling system, causes the information handling system to further perform actions that include:
- receiving a password change request from a centralized password manager at each of the plurality of password change interval trackers; and
- replacing, by each of the plurality of password change interval trackers, their corresponding current password with their corresponding future password.

* * * * *